Figure 1:
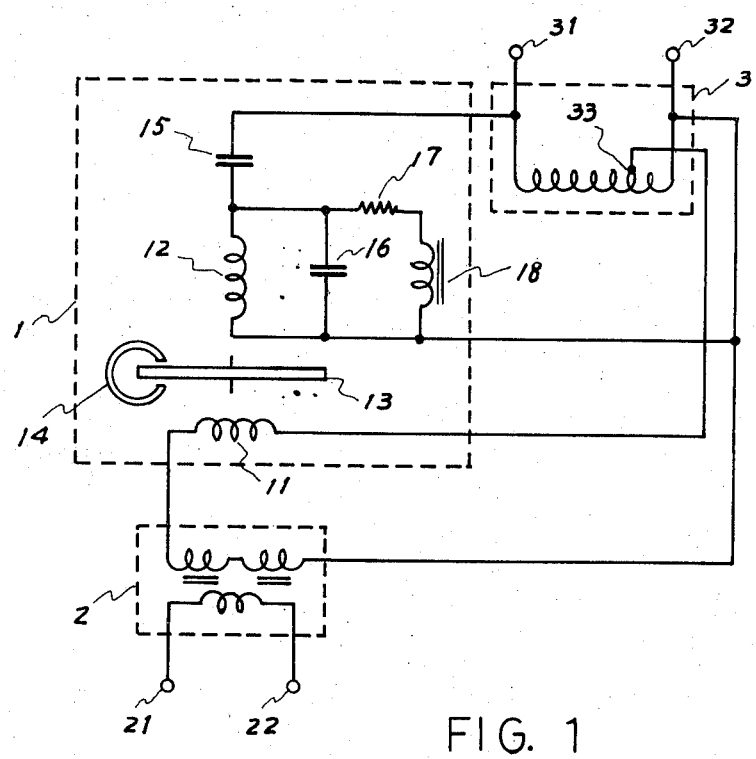

United States Patent [19]
Tsuda

[11] 3,808,530
[45] Apr. 30, 1974

[54] DIRECT CURRENT AMPERE-HOUR METER

[76] Inventor: Zenichiro Tsuda, 4-12, 2-chome, Tenjin, Ikeda-shi, Osaka-fu,, Japan

[22] Filed: Sept. 5, 1972

[21] Appl. No.: 286,222

[52] U.S. Cl. ........................................... 324/117 R
[51] Int. Cl. ............................................ G01r 19/00
[58] Field of Search ......... 324/117, 141; 323/77, 76

[56] References Cited
UNITED STATES PATENTS
2,759,151  8/1956  Wagner ............................. 324/117
3,240,957  3/1966  Nishidai ............................ 323/76 X

*Primary Examiner*—Alfred E. Smith

[57] ABSTRACT

A direct current watt-hour meter having a rotary disc, voltage and current coils for effecting rotation of the disc, a capacitor in series with the voltage coil and a series circuit including a resistor and choke coil connected in parallel with said voltage coil.

2 Claims, 3 Drawing Figures

DIRECT CURRENT AMPERE-HOUR METER

This invention relates to an improved direct current ampere-hour meter of the induction type.

Prior d.c. ampere-hour meters of this type have been constructed similar to conventional a.c. watt-hour meters in that each meter included a rotary disc, a voltage or pressure coil and a current coil which are quite similar to those of an a.c. watt hour meter and a d.c. transformer for converting a d.c. current change into an a.c. current change and which is inserted in the current coil circuit. In operation, constant a.c. operation voltages are applied respectively across the voltage and current coils and a d.c. current which is to be measured is supplied to the input terminals of the d.c. transformer. However, when the source of the operation voltages is affected by voltage fluctuation, the rotational torque produced by the voltage and current coils on the rotary disc is also affected by this fluctuation and results in an incorrect indication of the meter. In order to overcome that difficulty in the prior d.c. ampere-hour meter, a constant voltage device had been inserted in the circuit of the operation voltage source or a differential braking coil had been attached to the rotary disc. However, these attachments for improving the characteristic of the meter adversely affected cost reduction and miniaturization of the meter.

Therefore, an object of this invention is to provide an improved d.c. ampere-hour meter which overcomes the operation voltage fluctuation without the use of the above mentioned costly and bulky attachments.

According to this invention, the voltage coil is provided with a capacitor connected in series therewith and a series connection of a resistor and a choke coil connected in parallel therewith.

The configuration and operation of the inventive device will be best understood by reading the following description with reference to the accompanying drawings.

Figure 2:
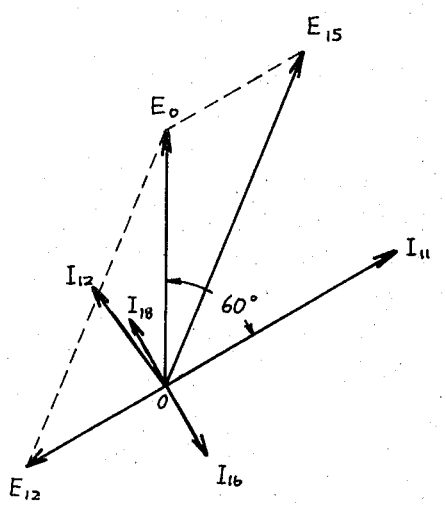
Figure 3:
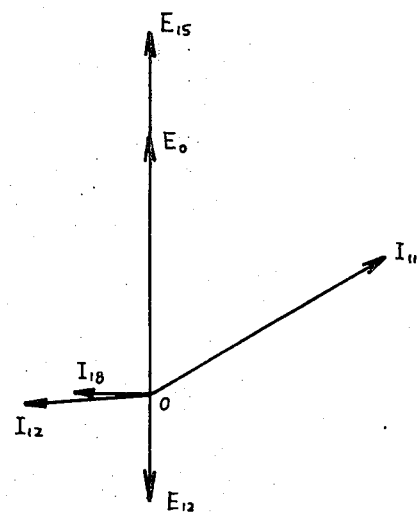

In the drawings:

FIG. 1 is a schematic circuit diagram representing an embodiment of a d.c. ampere-hour meter constructed in accordance with this invention, and FIGS. 2 and 3 are vector diagrams for explaining the improved operation of the d.c. ampere-hour meter of this invention.

Referring to FIG. 1, the d.c. ampere-hour meter includes an induction integrating watt-meter section 1, a d.c. transformer 2 and an autotransformer 3. The watt-meter section 1 includes a current coil 11 and a voltage or pressure coil 12 which are wound respectively on iron cores (not shown) positioned in facing relationship on both sides of an aluminium rotary disc 13 for producing a rotating magnetic field therebetween. The rotary disc 13 is provided with a braking magnet 14. These components are quite similar to those of the conventional a.c. watt-hour meter. According to this invention, a capacitor 15 is inserted between the voltage coil 12 and one terminal 31 of the autotransformer 3, the other terminal 32 of which is connected to the other end of the voltage coil 12. Another capacitor 16 and a series connected resistor 17 and choke coil 18 are connected in parallel with the voltage coil 12, and the terminal 32 of the autotransformer 3 is also connected through a secondary winding of the d.c. transformer 2 and the current coil 11 to an intermediate tap 33 of the autotransformer 3.

EXAMPLE

A d.c. ampere-hour meter was tentatively constructed in accordance with this invention. The current coil of a conventional single phase a.c. watt-hour meter rated at 100 volts, 20 amperes was rewound to have 200 turns and the secondary winding having 100 × 2 turns of a window type d.c. transformer rated at 100 amperes and provided with a ring core of 3 square centimeters cross-sectional area was inserted in series with the current coil. The intermediate tap 33 of the autotransformer 3 was selected so as to induce a voltage of 17 volts when an operation voltage of 200 volts was applied between both terminals 31 and 32. The other components were selected as follows:

| | |
|---|---|
| Capacitor 15 | 0.4 microfarad |
| Capacitor 16 | 1.0 microfarad |
| Resistor 17 | 200 ohms |
| Choke coil 18 | 2000 turns |
| | Core section: 12 × 12 millimeters |
| Meter constant: | 36 revolutions/ampere-hour |

A test measurement of this test device gave the results as shown in the following Table 1.

TABLE 1

| | LOAD CURRENT (Amperes) | 100 | 75 | 50 | 25 | 10 | 0 |
|---|---|---|---|---|---|---|---|
| | NUMBER OF ROTATIONS | 60 | 45 | 30 | 15 | 6 | 0 |
| | OPERATION VOLT. | | | | | | |
| | 180 | 60.6 | 60.2 | 59.5 | 60.8 | 62.4 | 0 |
| TIME | 200 | 60.1 | 60.0 | 59.5 | 59.9 | 59.6 | 0 |
| (Sec.) | 220 | 60.1 | 60.6 | 60.1 | 59.6 | 57.1 | 0 |

These results mean that the fluctuation of the number of rotations of the rotary disc 13 is less than two percent with respect to a 10 percent fluctuation of the operation voltage, except in the case of a very low load current such as 10 amperes, so that the device is sufficiently accurate for practical use.

During the test measurement, voltages and currents were measured at various points in the circuit. They are shown in the following Table 2.

TABLE 2

| $E_0(V)$ | $E_{15}(V)$ | $I_{15}(A)$ | $E_{16}(V)$ | $I_{16}(A)$ | $I_{12}(A)$ | $I_{18}(A)$ |
|---|---|---|---|---|---|---|
| 180 | 266 | 36.5 | 126 | 39.7 | 48.2 | 26.6 |
| 200 | 292 | 40.5 | 129 | 40.6 | 49.6 | 29.7 |
| 220 | 316 | 44.2 | 132 | 41.5 | 50.6 | 33.5 | where $E_0$ is the operation voltage, $E_{15}$ and $I_{15}$ are voltage current on the capacitor 15, $E_{16}$ and $I_{16}$ are voltage and current on the capacitor 16, $I_{12}$ is a current in the voltage coil 12 and $I_{18}$ is a current in the choke coil 18.

Table 2 can be redrafted as a vector diagram as shown in FIG. 2. Since the current $I_{11}$ flowing in the current coil 11 has a tendency to lag the operation voltage $E_0$ by about 60° and $I_{16}$ and $I_{18}$ which are nearly perpendicular to $E_{12}$ and opposite in direction are almost cancelled, the phase difference between the currents $I_{11}$ and $I_{12}$ in the current coil 11 and voltage coil 12 respectively is nearly 90°. This means that a maximum torque can be obtained by this configuration.

When the capacitor 16 is omitted from the above circuit, the phase of the voltage $E_{15}$ has approximately the same phase as the operation voltage E and the phase of the voltage $E_{12}$ has a phase approximately opposite to the phase of $E_0$ as shown in FIG. 3. Therefore, the phase of the current $I_{12}$ functions to reduce the torque. However, this reduction does not affect the utility of the device.

It is desirable that the choke coil 18 has an iron core with saturated flux density, because the choke current $I_{18}$ varies considerably with the fluctuation of the operation voltage $E_0$ and, consequently, the voltage fluctuation across the voltage coil 12 is materially reduced.

As readily understood from the above description, the d.c. ampere-hour meter of this invention can be constructed by adding only a few components, which are very inexpensive to the conventional a.c. watt-hour meter. Therefore, both cost reduction and miniaturization can be effected.

What is claimed is:

1. A direct current ampere-hour meter comprising a rotary disc, a voltage coil and a current coil for rotating said rotary disc, a direct current transformer having a secondary winding connected in series with said current coil, and an a.c. voltage source for applying an operating voltage to said voltage and current coils, a capacitor connected in series with said voltage coil, and a series connection of a resistor and a choke coil connected across said voltage coil.

2. A direct current ampere-hour meter according to claim 1 wherein a second capacitor is connected across said voltage coil.

* * * * *